Sept. 14, 1948. J. R. SMILEY 2,449,181
NONREMOVABLE TRANSPARENT IDENTIFICATION
BAND WITH A TAG THEREIN
Filed April 26, 1944
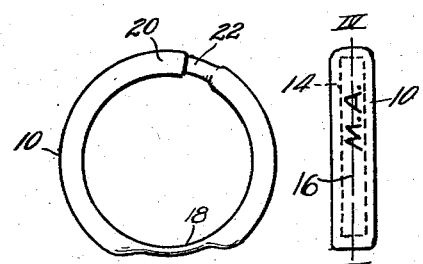
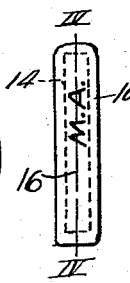
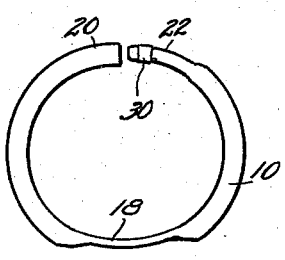
Fig. 1  Fig. 2  Fig. 3
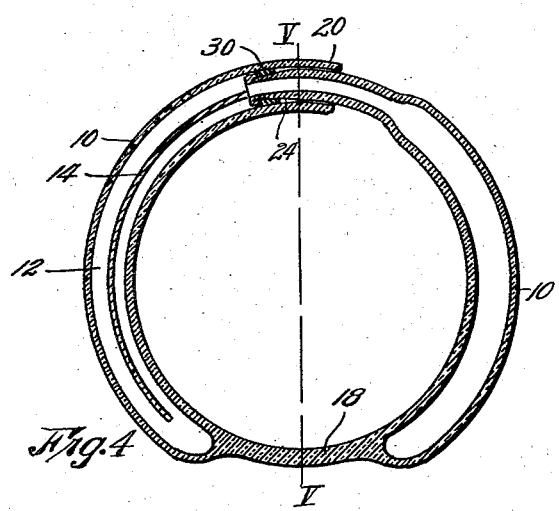
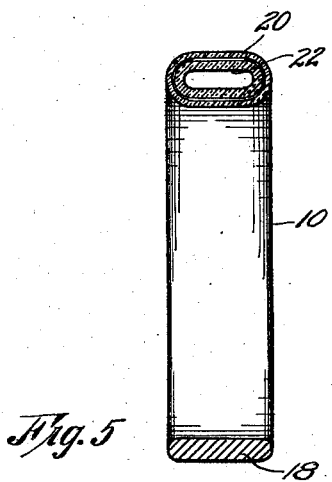
Fig. 4  Fig. 5
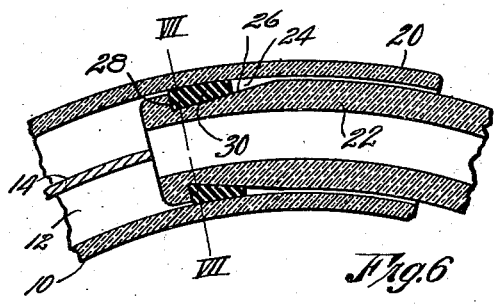
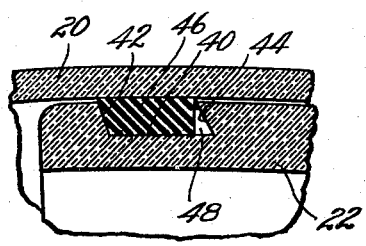
Fig. 6  Fig. 8
Fig. 7
INVENTOR,
John R. Smiley.
BY Roy E. Hamilton.
Attorney.

Patented Sept. 14, 1948

2,449,181

UNITED STATES PATENT OFFICE 2,449,181

NONREMOVABLE TRANSPARENT IDENTIFICATION BAND WITH A TAG THEREIN

John R. Smiley, Kansas City, Mo.

Application April 26, 1944, Serial No. 532,828

5 Claims. (Cl. 40—19)

1

This invention relates to improvements in nonremovable identification bands or bracelets and has particular reference to a type of band wherein is sealed an identification tag.

While generally this invention provides for a band or bracelet of a type which is especially designed to prevent substitution of objects identified thereby, yet it is particularly suitable for identifying infants in a hospital or nursery.

The principal object of the present invention is the provision of a non-removable identifying band having telescoping end portions provided with simple means whereby said telescoping portions when interengaged may be relatively moved in one direction only, thereby preventing removal of said band when it has once been positioned on an object.

Another object is the provision of an identification band having telescoping tubular end portions adapted to form an identification tag receiving compartment and means positioned between said telescoping end portions to permit telescoping movement but to preclude separation of the telescoping end portions and to hermetically seal said compartment.

Other objects are simplicity and economy of construction, ease and efficiency of operation and adaptability for use in identification of animate or inanimate objects to prevent substitution.

Other objects will appear during the course of the specification.

Reference will now be had to the drawing wherein:

Fig. 1 is a side elevation of a non-removable identification band embodying this invention.

Fig. 2 is an edge view of the band shown in Fig. 1.

Fig. 3 is an elevational view of the band shown in its normal position before positioning on an object.

Fig. 4 is an enlarged sectional view taken on line IV—IV of Fig. 2.

Fig. 5 is a sectional view taken on line V—V of Fig. 4.

Fig. 6 is an enlarged fragmentary section showing the interengaging portions of the band or bracelet.

Fig. 7 is a cross sectional view taken on line VII—VII of Fig. 6.

Fig. 8 is an enlarged, fragmentary, sectional view of a modified form of the sealing and holding means for the telescoping end portions of the band.

Throughout the several views like reference characters refer to similar parts and the numeral 10 designates a band of resilient material such as plastics or any other material having the requisite properties as hereinafter set forth.

Band 10 is preferably made of transparent material of tubular structure to present a compartment 12 for the reception of a tag or strip 14 bearing indicia 16 whereby the object to which the band is secured is identified. The strip 14 is preferably made of a strip of resilient material that may be easily flexed but will not be easily folded so that it can be inserted at the open end of the tube and will hold its proper shape as it is moved into the compartment 12. The resilient quality of the strip will cause it to hug the walls of the compartment so that the strip will maintain a fixed position relative to the tube whereby the identifying indicia will be visible through the transparent outer wall of the band at all times.

Band or bracelet 10 is split and provided intermediate its ends with a flattened segment or section 18 which can be flexed to permit relative movement of the end portions 20 and 22 of the band. The position of the flattened section 18 may be varied relative to the end portions of the band should it be found convenient to make tab compartment long or shorter.

Referring to the cross sections of the band, it will be noted that it is shown of substantially elliptical cross sectional form, however, it could be made circular or of any other desirable form without interfering with the functioning of the device as described.

The open end portion 20 of the tubular band is adapted to receive the reduced end portion 22 of the band 10 since they are made for a free sliding fit. The inner wall of portion 20 is of uniform cross sectional form and the end portion 22 is provided with a continuous outside groove 24 adjacent its free end. This groove 24 is tapered as shown so as to present an inclined wall 26 and a wall 28 substantially perpendicular to the axis of the tube, the wall 28 being adjacent the end of the tube and wall 26 recedes therefrom to form the wedge-shaped groove 24.

A band 30 of elastic material such as rubber is positioned in groove 24 to normally extend outwardly therefrom, but adapted to be compressed to enter tube end 20 and to seal the space between the tubes. Materials other than rubber which would act to seal the space between the tube and would serve the same general purposes as the rubber can be used.

It will be observed that the band normally is positioned with end portions positioned in alignment and in spaced apart adjacent relation, when so constructed the end portions may be moved farther apart to permit the insertion of the infant's hand, and then may be forced to the interengaging position as shown in Fig. 4. When the end portion 22 is inserted into end portion 20, as shown, the band will tend to return to its normal position, thereby exerting a force that would tend to separate the telescoping tube ends.

The band 30 not only functions to seal the compartment 12 but also functions to prevent separation of the end portions of the tube after the band has been set to the proper size about a body. This securing action is as follows:

When the tubes are being forced together, the band 30, which does not completely fill groove 24, slides back on inclined wall 26 and does not exert sufficient pressure to prevent insertion of 22 into 20; however, when force is exerted to separate the end portions, the band 30 is forced tightly against wall 28 and the friction set up between the band 30 and the inner wall of 20 is sufficient to force the band 30 outwardly with sufficient force to prevent a separation of band ends, furthermore, the greater the force exerted to separate the tubes, the greater holding power of the band against the tube wall. From the above descriptions, it is apparent that the structure provided, permits the forcing together of the telescoping end portions of the band but precludes the separation of the telescoping parts, so that the only way to remove the band from the object is by severing the band.

The modified form shown in Fig. 8 provides a groove 40 having an outwardly and forwardly extending inclined front end wall 42 and an inwardly and rearwardly inclined rear wall 44. The rubber band 46 positioned in groove 40 does not completely fill the groove, thus providing a recess 48. When the tube 22 is being inserted in 20 the band 46 is forced into recess 48 and the pressure of the rubber band against the tube 20 is reduced so as to permit telescoping of the tubular parts. However, when force is exerted to separate the tubes, the rubber band is forced outwardly against the inner wall of tube 20 thus securing the tubes together.

It is apparent that I have produced a nonremovable identification band that is easily positioned to any desired size between certain limits and one that cannot be removed without destroying the band for further use.

What I claim as new and desire to be secured by Letters Patent is:

1. A non-removable identification band comprising a flexible elongated member having tubul end portions and being formed to present a closed band, one of said end portions being circumferentially grooved and formed to telescope into the other of said end portions, a resilient band positioned in the groove of said end portion to engage the inner wall of the outer tube whereby said telescoping tube portions are permitted to move relative to each other in but one direction and an identification tag positioned in the outside tubular portion of said elongated member.

2. A non-removable identification band comprising an elongated transparent member having tubular end portions adapted to be telescoped to form a compartment and a flexible intermediate portion one of said end portions being circumferentially grooved, an identification tag mounted in said compartment, and means positioned between said telescoping end portions and in said groove to preclude relative movement of the telescoping tubular portions in one direction and to seal the tag containing compartment formed by said telescoping tubular portions.

3. A non-removable identification band comprising an elongated member having transparent telescoping tubular end portions and an intermediate flattened flexible portion adapted to produce a closed band having a tag receiving compartment and one of said end portions being grooved, a tag having identification indicia positioned in said compartment, and a rubber band disposed in said groove between the adjacent walls of said telescoping end portions to seal said compartment and to prevent separation of said end portions.

4. A non-removable identification band comprising a flexible elongated transparent member having tubular end portions, one of said end portions being externally grooved and formed to telescope into the other of said end portions to form a closed band, an elastic band disposed in the groove formed in the outer wall of the inner telescoping end portion to engage the inner wall of the outer tube portion whereby to preclude relative movement of the telescoping tube portions in one direction, and an identification tag positioned in said tubular members.

5. A non-removable identification band comprising an elongated member having telescoping tubular end portions and an intermediate flattened flexible portion adapted to produce a closed band having a tag receiving compartment, said inner telescoping end portion being circumferentially grooved in its outer wall, and a rubber band disposed in said groove between the adjacent walls of said telescoping end portions to seal said compartment, to permit telescoping in one direction only, and to prevent separation of said end portions.

JOHN R. SMILEY.

REFERENCES CITED

The following references are of record in the file of this patent:

UNITED STATES PATENTS

| Number | Name | Date |
|---|---|---|
| 133,291 | Baker | Nov. 26, 1872 |
| 152,188 | Stone | June 16, 1874 |
| 703,008 | Scott | June 24, 1902 |
| 747,061 | Gilbert | Dec. 15, 1903 |
| 1,109,394 | Bourne | Sept. 1, 1914 |
| 1,182,254 | Cummins | May 9, 1920 |
| 1,350,070 | Couture | Aug. 17, 1920 |
| 1,538,007 | Schellin | Nov. 23, 1923 |
| 1,676,927 | Richard | July 10, 1928 |
| 2,136,906 | McAdams | Nov. 15, 1938 |